Feb. 11, 1969  A. K. SCHMIEDER  3,426,587
RUPTURE TEST SPECIMEN AND COUPLING THEREFOR
Filed April 28, 1967
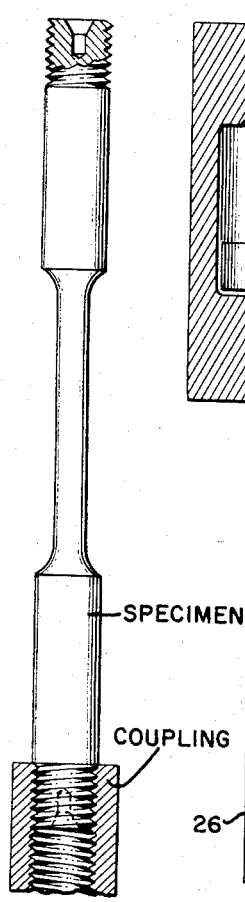
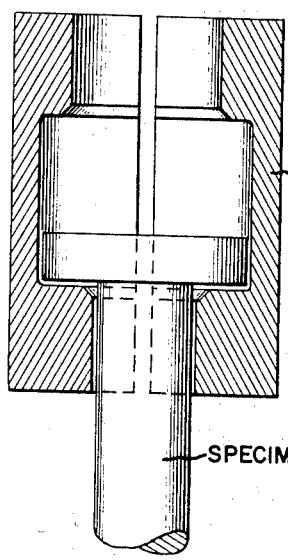
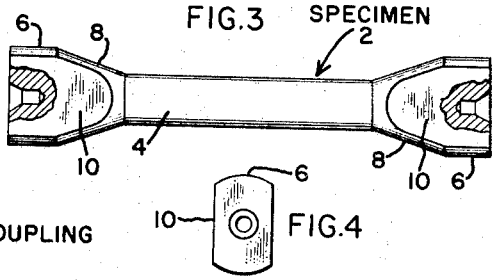
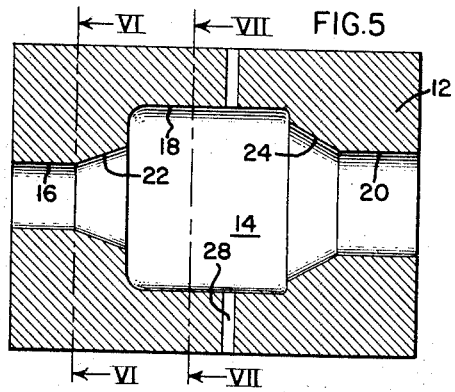
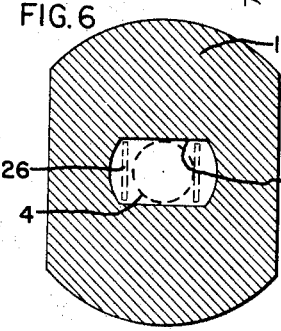
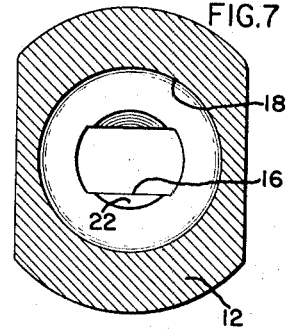
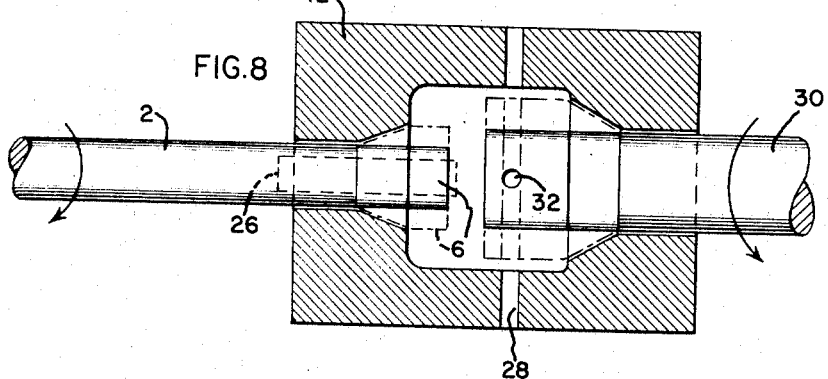
INVENTOR:
ALBERT K. SCHMIEDER,
BY Robert J. Bird
HIS ATTORNEY.

United States Patent Office 3,426,587
Patented Feb. 11, 1969

3,426,587
RUPTURE TEST SPECIMEN AND COUPLING
THEREFOR
Albert K. Schmieder, Scotia, N.Y., assignor to General
Electric Company, a corporation of New York
Filed Apr. 28, 1967, Ser. No. 634,533
U.S. Cl. 73—103                                4 Claims
Int. Cl. G01n 3/04

ABSTRACT OF THE DISCLOSURE

An apertured coupling member in which the aperture has a circular central cross section and elongated end cross sections. A mating rod member of enlarged end portion having similar elongated cross section.

Background of the invention

The present invention is related to rupture test specimens and coupling members for applying a tensile force thereto during rupture testing. Such couplings are used to connect the ends of tensile specimens to rods called load bars which are a part of a rupture testing machine which in turn pulls on the load bars and transmits the force through the couplings to the test specimen.

Rupture tests are often performed over long periods of time on a test specimen in an atmosphere of elevated temperature. The test of course destroys the specimen but the coupling members are reused as long as possible.

In one common form of coupling known to the prior art, an internally threaded, generally cylindrical, coupling member is simply threaded onto the externally threaded test specimen. An example of this is shown in FIG. 1 of the drawing. This coupling is a simple and straightforward design but it has the disadvantages of creating bending stresses in the tensile specimen due to oxidizing of the threads and seizing of the coupling on the specimen threads. Forces on the tensile specimen other than direct axial forces, of course, impair the accuracy of the test. If, during extended high temperature testing, a specimen seizes in the coupling, the specimen must be removed by drilling out the broken end and then retapping the coupling. Repeated tapping of the threads on these load couplings results in the member being too loose and therefore too weak for further use.

Another prior art form of test coupling is the split button-head coupling. An example of this is shown in FIG. 2 of the drawing. In this form, the coupling is split on an axial plane into two identical halves. These halves simply set over the shoulders of a tensile specimen and are bound together. This form of coupling provides reliable axial loading and can be refinished many times after use if necessary. Furthermore, it is easily assembled after the specimen breaks. However, this form of coupling has the disadvantage of being more difficult to assemble for use and care must be exercised to match two halves of the same pair so that axiality of loading is maintained.

Accordingly, it is an object of the present invention to provide a single piece coupling for specimen testing with a simplicity of design and operation as compared to the prior art devices discussed above.

Another object is to provide a single piece tension test coupling which provides improved axiality of loading.

Another object is to provide a single piece coupling which is reusable to an improved extent.

Another object is to provide a coupling and a test specimen which are easily assembled and disassembled.

Another object is to provide a coupling and specimen which lend themselves to an improved economy of manufacture by permitting test specimens to be made from stock having no greater thickness than that desired in the specimen gage length.

Other objects, advantages and features will become apparent from the following description taken in connection with the accompanying drawing.

Summary of the invention

The present invention is practiced in one form by a coupling member having a longitudinal aperture therethrough. The aperture has a circular central cross section and an elongated cross section in each end portion of the member. A mating rod member has a similarly sectioned end portion so that the rod member fits into the elongated aperture and, by virtue of the fact that the aperture is circular in the central part of the member, the rod member is rotatable 90° to provide a positive coupling between coupling member and rod member.

Drawing

In the drawing:

FIG. 1 is a longitudinal view of a coupling and specimen member of the prior art as heretofore mentioned, FIG. 2 is a longitudinal view of a coupling and specimen member, also known to the prior art, as heretofore mentioned, FIG. 3 is a longitudinal view of a test specimen according to the present invention, FIG. 4 is an end view of the specimen shown in FIG. 3, FIG. 5 is a longitudinal section of the coupling member of the present invention, FIG. 6 is a sectional view taken along the lines VI—VI of FIG. 5, FIG. 7 is a sectional view taken along the lines VII—VII of FIG. 5, and FIG. 8 is a sectional view of the assembled test specimen and coupling member according to the present invention.

FIG. 9 is an elevation view of a locking member used in the present invention.

Description

Referring now to FIG. 3, showing a longitudinal view of a test specimen usable in the present invention, the specimen 2 has a central portion or gage length 4, and enlarged end portions 6, the transition from gage length to end portions being the tapered surfaces 8. Gage length 4 is of course uniformly cylindrical along its length.

Referring now to FIG. 4, showing the end view of specimen 2, it will be seen that end portions 6 of the specimen appear as a circle having segments, defined by parallel chords, removed therefrom on each side of the axis of the circle. That is to say, that in cross section, end portions 6 are elongated having flat sides 10.

Referring now to FIG. 5, the coupling member of the present invention is generally shown at 12. Member 12 is a single piece and defines a longitudinal passage, generally indicated at 14, therethrough. Passage 14 comprises a specimen end aperture portion 16, a central chamber 18, and a load bar end aperture portion 20. Central chamber 18 is circular in cross section while end apertures 16 and 20 are elongated as, for example, shown in FIG. 6. FIG. 7 shows the circular cross section of central chamber 18 and also an elongated section of end aperture 16. The end aperture 16 has a tapered transition 22 joining the central chamber 18. Similarly, the central chamber 18 adjoins end aperture 20 by a tapered transition part thereof, as shown at 24. A transverse hole 28 passes through member 12.

The operation of the coupling and specimen will be apparent from the foregoing description and is shown in FIG. 8. Specimen 2 fits into end aperture 16 when the elongated portion 6 of the specimen is aligned with the elongated portion of aperture 16. After the specimen is inserted within coupling member 12, a 90° rotation of one relative to the other (as shown in phantom in FIG. 8) will cause the tapered surface 8 of elongated portion 6 of the specimen to abut against the tapered surface 22. The enlarged chamber 18 permits rotation of the specimen relative to the coupling when inserted. The U-shaped locking member 26 is then inserted through end aperture 20, prior to insertion of load bar 30, over the end of specimen 2 providing positive locking against rotation relative to coupling member 12. This is shown in phantom in FIG. 6.

On the opposite end of coupling member 12, a similar end aperture 20 combines with a testing machine load bar 30, which is similarly shaped, is substantially the same manner as above described for the same purpose. The dimensions are different so that the load bar will be a permanent member and the test specimen will be the weak link in the system, according to its purpose. The load bar has a transverse hole or notch 32 which is aligned with hole 28 in member 12 when the members are joined. A pin or wire passed through holes 28 and 32 provides positive locking against rotation of load bar 30 relative to member 12.

It will be apparent that the above described combination of specimen and coupling member has advantages over the prior art, including the following, in accordance with the aforementioned objects.

The tapered surfaces of the specimen and the coupling provide improved axiality of loading. The coupling and specimen are simple in design and operation. The two are easily assembled and disassembled by removal of a locking member and a mere 90° turn and reusable many times. The tapered shape of specimen 2 is more easily ground, that is, it is made by a single plunge grinding operation as compared to the square shouldered specimen of the prior art which necessitated an extra machining operation. The specimen piece 2, being elongated in one direction and relatively narrow in the other direction, may be manufactured from thin shapes of the desired material to be tested, such as turbine blades. That is, the specimen stock need be only as thick as the specimen gage length. In both of the prior art specimens as described, the end portions are substantially enlarged relative to the gage length portion, necessitating their manufacture from a material at least as thick as the enlarged end dimension.

It may occur to others of ordinary skill in the art to make modifications of the present invention which will remain within the concept and scope thereof and not constitute a departure therefrom. Accordingly, it is intended that the invention be not limited by the details in which it has been described but that it encompass all within the purview of the following claims.

What is claimed is:
1. A specimen testing coupling member defining a longitudinal passage therethrough for the connection of said coupling member with a test specimen, said passage having end apertures and a central chamber, said central chamber being larger in cross sectional area than said apertures,
    at least one of said end apertures being elongated in cross section.
2. A coupling member as defined in claim 1 in which said end apertures include transition portions adjoining said central chamber, said transition portions being circular in section at their inner ends adjacent said chamber and elongated in section at their outer ends, the transition portions having major dimensions at their outer ends substantially equal to that at their inner ends and minor dimensions at their outer ends increasing gradually to that at their inner ends.
3. A rupture test specimen and a coaxial coupling member to join therewith, said specimen comprising a middle gage length portion and enlarged specimen end portions, said specimen end portions being elongated in transverse action, said coupling member defining a longitudinal passage therethrough, said passage having end apertures and a central chamber, said central chamber being larger in cross sectional area than said apertures, said end apertures being elongated in cross section,
    said specimen end portion being insertable and rotatable relative to said coupling member, and
    means to lock said specimen from rotation relative to said coupling member.
4. A rupture test specimen and a coupling member as defined in claim 3 in which said specimen has partially conical transition portions between the middle portion and the specimen end portions thereof, and said aperture has partially conical transition portions outward from said central chamber, said transition portions being substantially circular in section at their inner ends adjacent said chamber and elongated in section at their outer ends.

References Cited

UNITED STATES PATENTS 1,122,289 12/1914 Loveland _____ 73—103
1,341,431 5/1920 Morrow _____ 73—103

OTHER REFERENCES

Advanced Technical Data Sheet, Specimen Grips Model 640.08, MTS Division, Research Incorporated, Minneapolis, Minn.

JAMES J. GILL, *Primary Examiner.*

C. M. OVERBEY, *Assistant Examiner.*